(12) United States Patent
Rowse et al.

(10) Patent No.: US 11,917,946 B2
(45) Date of Patent: Mar. 5, 2024

(54) HAY RAKE TOOTH ASSEMBLY (71) Applicant: Rowse Hydraulic Rakes Co., Inc., Burwell, NE (US)

(72) Inventors: Dannie Dean Rowse, Ord, NE (US); Rodney Dean Rowse, O'Neill, NE (US)

(73) Assignee: Rowse Hydraulic Rakes Co Inc, Burwell, NE (US)

( * ) Notice: Subject to any disclaimer, the term of this patent is extended or adjusted under 35 U.S.C. 154(b) by 0 days.

(21) Appl. No.: 18/153,808

(22) Filed: Jan. 12, 2023

(65) Prior Publication Data

US 2023/0165187 A1 Jun. 1, 2023

Related U.S. Application Data (63) Continuation of application No. 16/736,471, filed on Jan. 7, 2020, now Pat. No. 11,596,099, which is a continuation-in-part of application No. 14/254,281, filed on Apr. 16, 2014, now Pat. No. 10,624,268.

(60) Provisional application No. 61/812,813, filed on Apr. 17, 2013.

(51) Int. Cl.
*A01D 7/06* (2006.01)
*A01F 7/02* (2006.01)

(52) U.S. Cl.
CPC . *A01D 7/06* (2013.01); *A01F 7/02* (2013.01)

(58) Field of Classification Search
CPC ............ A01D 7/06; A01D 7/02; A01D 80/02
See application file for complete search history.

(56) References Cited

U.S. PATENT DOCUMENTS

| | | | | | |
|---|---|---|---|---|---|
| 2,597,485 | A | * | 5/1952 | Hillyer | A01D 34/535 172/834 |
| 2,909,889 | A | * | 10/1959 | Gustafson | A01D 80/02 56/400 |
| 2,989,835 | A | * | 6/1961 | Johnston | A01D 80/02 56/400 |
| 3,031,835 | A | * | 5/1962 | Gustafson | A01D 80/02 56/400 |
| 3,096,609 | A | * | 7/1963 | Garrett | A01D 80/02 56/400.01 |
| 3,102,377 | A | * | 9/1963 | Garrett | A01D 80/02 56/400.01 |
| 3,126,693 | A | * | 3/1964 | Renn | A01D 89/002 172/705 |
| 3,157,019 | A | * | 11/1964 | Brackbill | A01D 80/02 172/705 |
| 3,186,153 | A | * | 6/1965 | Breed | A01D 80/02 56/400 |
| 3,192,696 | A | * | 7/1965 | Hurry | A01D 80/02 56/400 |
| 3,226,922 | A | * | 1/1966 | Luther | A01D 80/00 56/400 |
| 3,253,393 | A | * | 5/1966 | Johnston | A01D 80/02 172/543 |

(Continued)

*Primary Examiner* — Arpad Fabian-Kovacs
(74) *Attorney, Agent, or Firm* — ZarleyConley PLC (57) ABSTRACT

A hay rake tooth assembly for use with a mounting clip on a hay rake wheel. The hay rake tooth assembly has a tine with a ball-shaped retaining member that is configured to permit a shaft of the tine to move along the length of the difference in diameter between the shaft and a tine opening of the mounting clip in which is the tine is assembled.

7 Claims, 9 Drawing Sheets

(56) References Cited

U.S. PATENT DOCUMENTS

| | | | | |
|---|---|---|---|---|
| 3,253,394 A * | 5/1966 | Johnston | A01D 80/02 | 172/543 |
| 3,253,395 A * | 5/1966 | Johnston | A01D 80/02 | 56/400 |
| 3,261,153 A * | 7/1966 | Johnston | A01D 80/02 | 172/543 |
| 3,401,515 A * | 9/1968 | Fishbaugh | A01D 80/02 | 56/400.21 |
| 3,402,542 A * | 9/1968 | Johnston | A01D 80/02 | 56/29 |
| 3,481,125 A * | 12/1969 | Miller | A01D 80/02 | 56/400 |
| 3,531,927 A * | 10/1970 | Wood | A01D 80/02 | 56/400 |
| 3,553,950 A * | 1/1971 | Waser | A01D 80/02 | 56/400.21 |
| 3,561,206 A * | 2/1971 | Fuller et al. | A01D 80/02 | 56/400 |
| 3,597,910 A * | 8/1971 | Stewart | A01D 80/02 | 56/400 |
| 3,664,107 A * | 5/1972 | Keller | A01D 80/02 | 56/400 |
| 3,698,172 A * | 10/1972 | Johnston | A01D 80/02 | 56/400 |
| 3,834,140 A * | 9/1974 | Delfino | A01D 80/02 | 56/400 |
| 3,859,777 A * | 1/1975 | Doering | E01H 1/106 | 56/364 |
| D237,527 S * | 11/1975 | Van Der Iely | D15/29 | |
| 3,921,376 A * | 11/1975 | Hofer | A01D 61/00 | 56/400.21 |
| 3,959,955 A * | 6/1976 | Smith | A01D 34/003 | D15/17 |
| 4,189,907 A * | 2/1980 | Erdman | A01D 80/02 | 56/400 |
| 4,473,994 A * | 10/1984 | Hein | A01D 80/02 | 56/400 |
| 4,481,758 A * | 11/1984 | Fishbaugh | A01D 80/02 | 56/400 |
| 10,674,668 B2 * | 6/2020 | Schroeder | A01D 80/02 | |
| D936,711 S * | 11/2021 | Worden | D15/29 | |

\* cited by examiner

HAY RAKE TOOTH ASSEMBLY

CROSS REFERENCE TO RELATED APPLICATION

This application is a continuation of U.S. application Ser. No. 16/736,471 filed on Jan. 7, 2020, which is a continuation-in-part of U.S. Pat. No. 10,624,268 filed on Apr. 16, 2014 and issued Apr. 21, 2020, which claims the benefit of U.S. Provisional Application No. 61/812,813 filed Apr. 17, 2013, the contents of these applications are hereby incorporated by reference in their entirety.

BACKGROUND OF THE INVENTION

This invention is directed towards a hay rake tooth assembly. More specifically, and without limitation, this invention relates to an improved tine for a hay rake tooth assembly.

Both hay rake tooth assemblies and mounting clips for hay rake teeth assemblies are well known in the art. A conventional mounting clip has an elongated member with a central portion and two widened sections on each end of the elongated member. The central portion has legs or flanges that engage the sides of a wheel rim to prevent the clip from turning with respect to the rim of a hay rake wheel.

To provide sufficient strength to prevent turning during raking operations, conventional mounting clips are 6.5 inches long. This length provides a spacing between hay rake teeth assemblies of 5.25 inches where a wheel having a diameter of 60.59 inches has approximately 19 clips and 38 hay rake teeth assemblies. Under normal raking conditions, this design is acceptable. However, when used in short hay or shredded crops, an unacceptable amount of crop passes between the wider teeth and is left in the field. In heavy, wet crops, conventional rakes jump over the crop leaving hay because they lack sufficient raking power.

One advancement that has occurred is disclosed in U.S. Ser. No. 14/254,281 from which the present application claims priority. The inventive mounting clip disclosed therein allows for a greater number of mounting clips to be attached around the diameter of the rim of the hay rake wheel with greater strength due to the presence of flanges of the clips.

Despite this advancement, other deficiencies exist. In conventional assemblies, the tine extends through the central portion of the mounting clip and is held in place by a rubber molding and the hole in the mounting clip in which the tine passes through. In this arrangement, the hole weakens the structural integrity of rubber molding. Since the position of the tine is retained only by the molding, when the molding fatigues, or is stressed beyond its limitations, the molding breaks and the tine is released into the field where the tine can puncture an implement tire, be run through a field chopper, or interfere with production in some other way.

One advancement in the art is disclosed in U.S. Pat. No. 10,412,892, which is incorporated by reference herein in its entirety. The mounting clip is improved by having swedged or cupped portions positioned above the openings for the tine, which extend upwardly from the mounting clip. The tine in the advancement have an enlarged portion that is received within the swedged portions, whereas the smaller portion of the tine passes through the openings. In this way, the enlarged portions are retained in the mounting clip when assembled.

Despite these advances and others, problems still remain. More particularly, conventional hay rake tooth assemblies and their advancements use a tine that has a flat, triangular, or conical retaining member that is retained between the rim of the hay rake wheel and the mounting clip. In these arrangements, the shape of the tine results in the tine being rigidly held in place due to the inability of the tine to change positions as the shape inhibits movement leading to substantial wear and eventual breakage of tines. Therefore, it is a primary objective of the present invention to provide a hay rake tooth assembly that improves upon the art.

Another objective of the present invention is to provide a hay rake tooth assembly that is stronger and more resilient.

Another objective of the present invention is to provide a hay rake tooth assembly that better retains a tine under stress or fatigue.

These and other objectives, features, and advantages of the invention will become apparent from the specification and claims.

SUMMARY OF THE INVENTION

In general, the present invention relates to a hay rake tooth assembly for use with a mounting clip on a hay rake wheel. The hay rake tooth assembly has a tine with a ball-shaped retaining member that is configured to permit a shaft of the tine to move along the length of the difference in diameter between the shaft and a tine opening of the mounting clip in which the tine is assembled.

The ability of the tine for movement made possible by the retaining member reduces the wear on the tine and drastically reduces the likelihood of breakage. In some embodiments, the present invention is assembled with a mounting clip using a molding that further secures the tine and inhibits the tine from rotating during operation.

In some embodiments, the mounting clip includes an elongated channel having a first end, a central portion, and an elongated second section. Along the elongated section are at least two laterally widened sections that provide greater surface area for receiving the molding. At least one of the ends of the channel extend beyond one of the laterally widened sections.

DETAILED DESCRIPTION

With reference to the figures, a hay rake tooth assembly 10 is shown for use with a mounting clip 12. The mounting clip 12 in some embodiments has an elongated channel 14 having a first end 16, a central portion 18, and a second end 20. The mounting clip 12 is laterally widened in two or more sections 22. The central portion 18 of the mounting clip 12 is positioned between the widened sections 22 and at least one of ends 16 and 20 extend beyond the widened sections 22. For example, in one arrangement, the length of the mounting clip 12 is 6.0 inches with one end 16 or 20 having a length of 0.5 inches. In one embodiment the central portion 18 extends the full length of the clip 12. In an alternative embodiment the clip 12 has multiple central portions 18 separated by a third, centrally located, widened section 22.

The mounting clip 12 has a connecting hole or opening 26 in a base plate 28 of the mounting clip 12 and legs or flanges 30 that extend radially inwardly from the base plate 28 and around the sides of a hay rake wheel rim 32 to maintain the mounting clip 12 in alignment with the hay rake wheel rim 32. The flanges 30 preferably are longer in the central portion 18 and at ends 16 and 20 to prevent the mounting clip 12 from turning with respect to the hay rake wheel rim 32. The hay rake wheel rim 32 also has a connecting hole or opening 34 that aligns with the connecting hole 26 of the mounting clip 12 to receive a fastener or bolt 36 therethrough to connect the mounting clip 12 with rim 32.

In another arrangement, the mounting clip 12 has the connecting hole 26 positioned substantially equidistance from the first end 16 and the second end 20. Positioned between the first end 16 and the connecting hole 26 and between the connecting hole 26 and the second end 20 are a pair of tine holes or openings 38. In some configurations, the pair of tine holes 38 have a swedged or cupped portion 40 that extends upwardly away from a top surface 42 of the base plate 28. Within the swedged portion 40 is a cavity 44.

Figure 1:
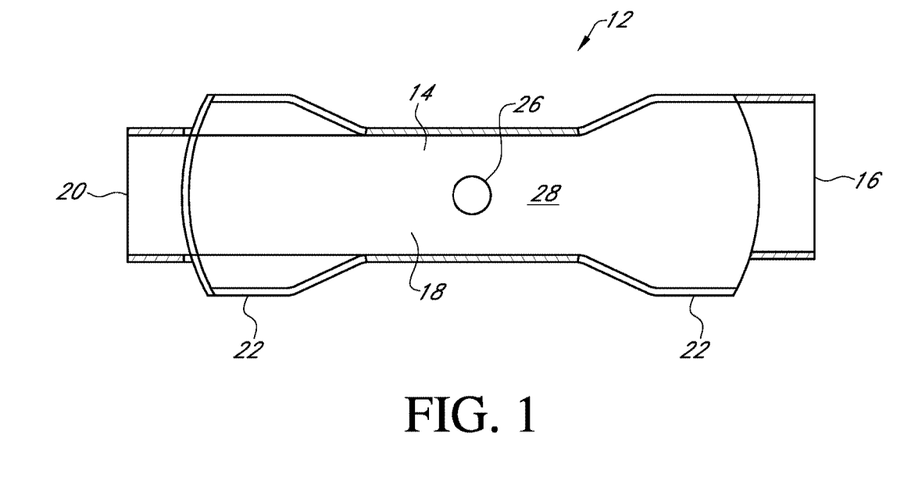
FIG. 1 is a bottom plan view of a prior art single mounting clip.
Figure 2:
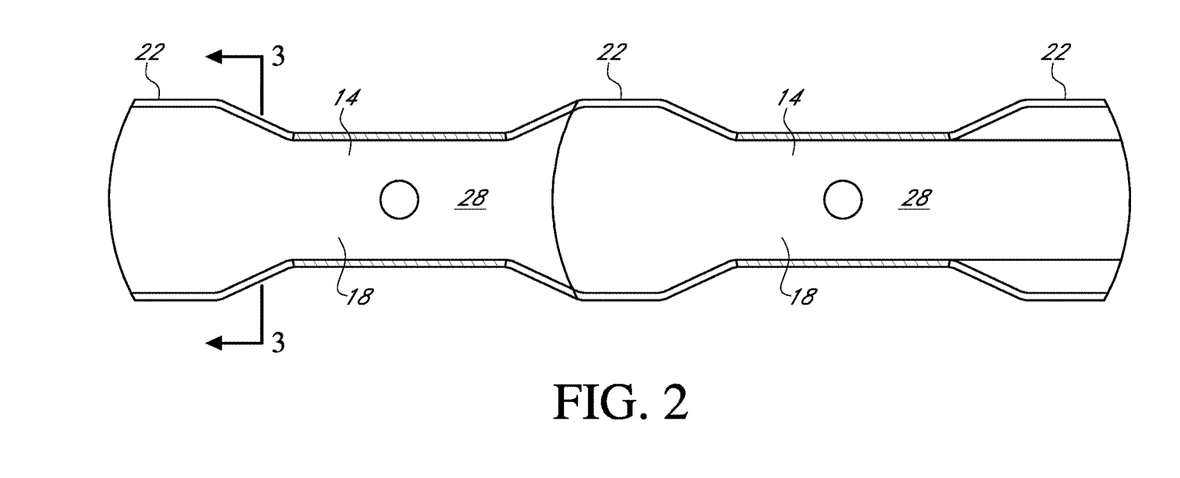
FIG. 2 is a bottom plan view of a mounting clip with more than one channel flange.
Figure 3:
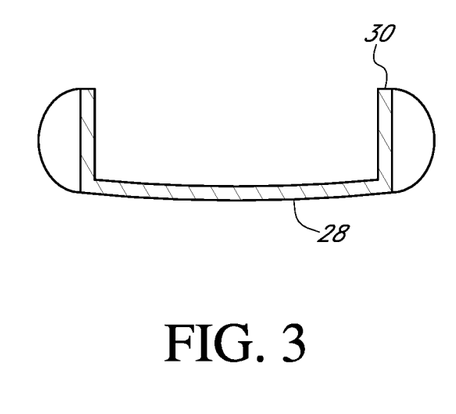
FIG. 3 is an end sectional view of a mounting clip.
Figure 4:
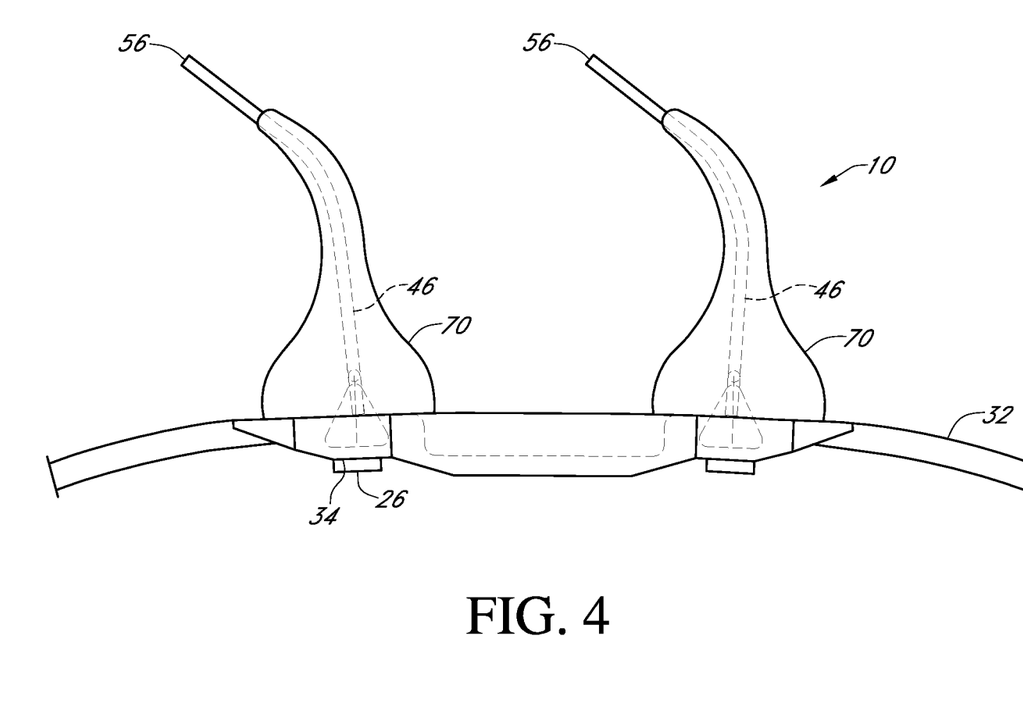
FIG. 4 is a side view of a plurality of hay rake tooth assemblies connected to a mounting clip.
Figure 5:
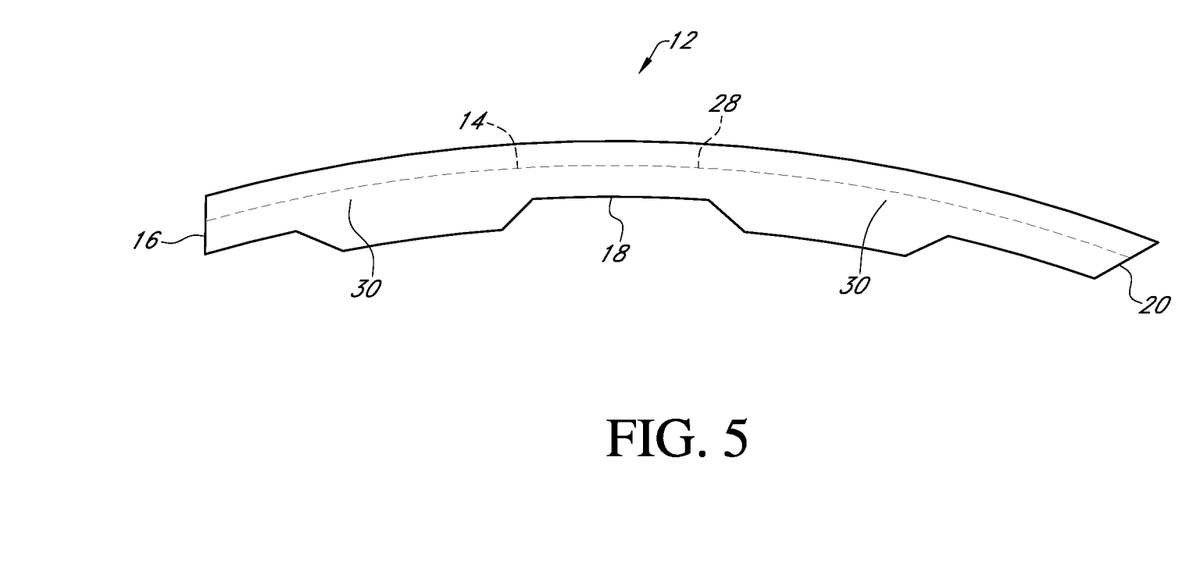
FIG. 5 is a side view of a mounting clip.
Figure 6:
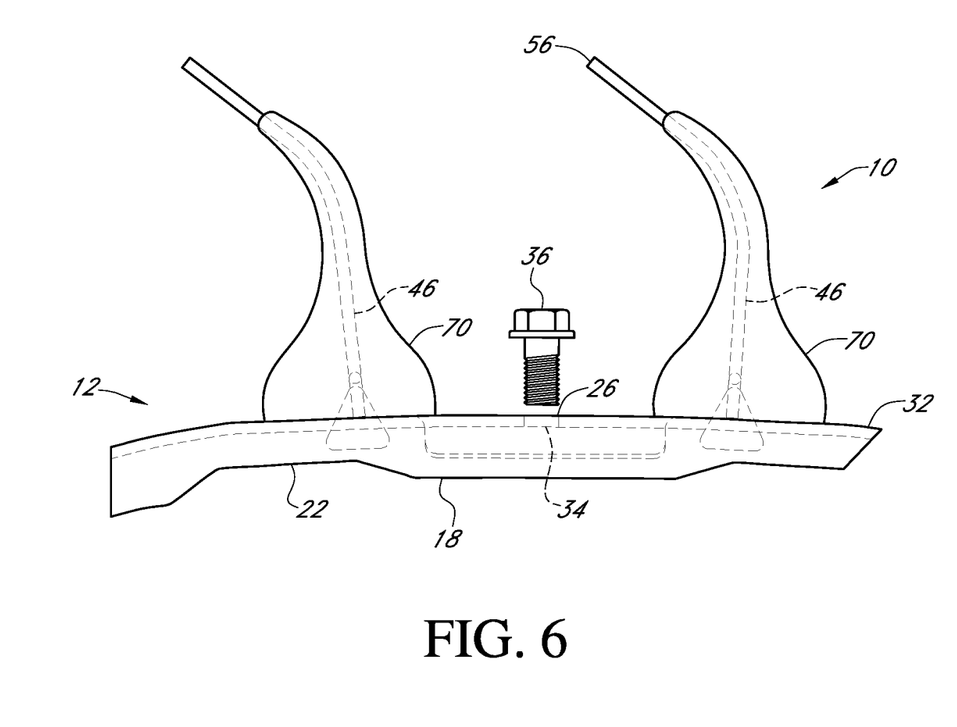
FIG. 6 is a side view of a plurality of hay rake tooth assemblies connected to a mounting clip.
Figure 7:
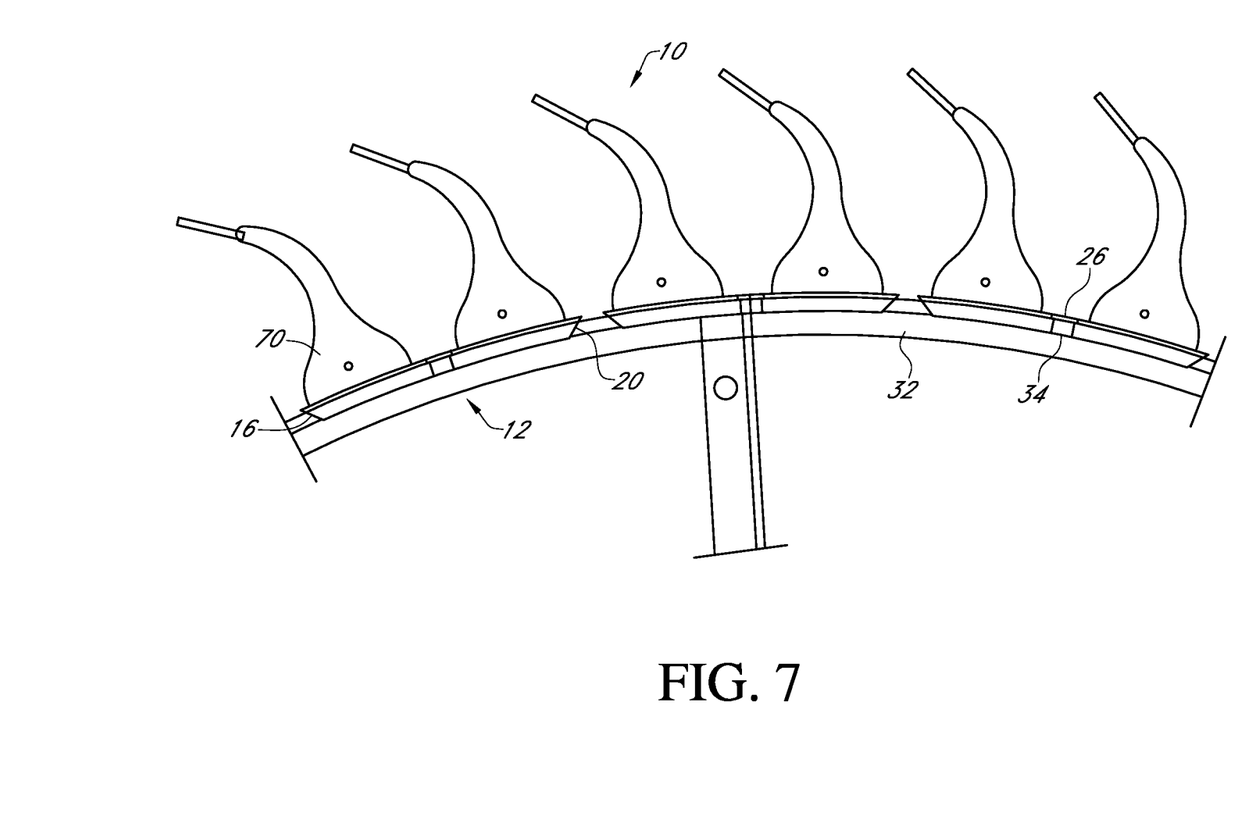
FIG. 7 is a side view of a plurality of hay rake tooth assemblies mounted to a hay rake with a plurality of mounting clips.
Figure 8:
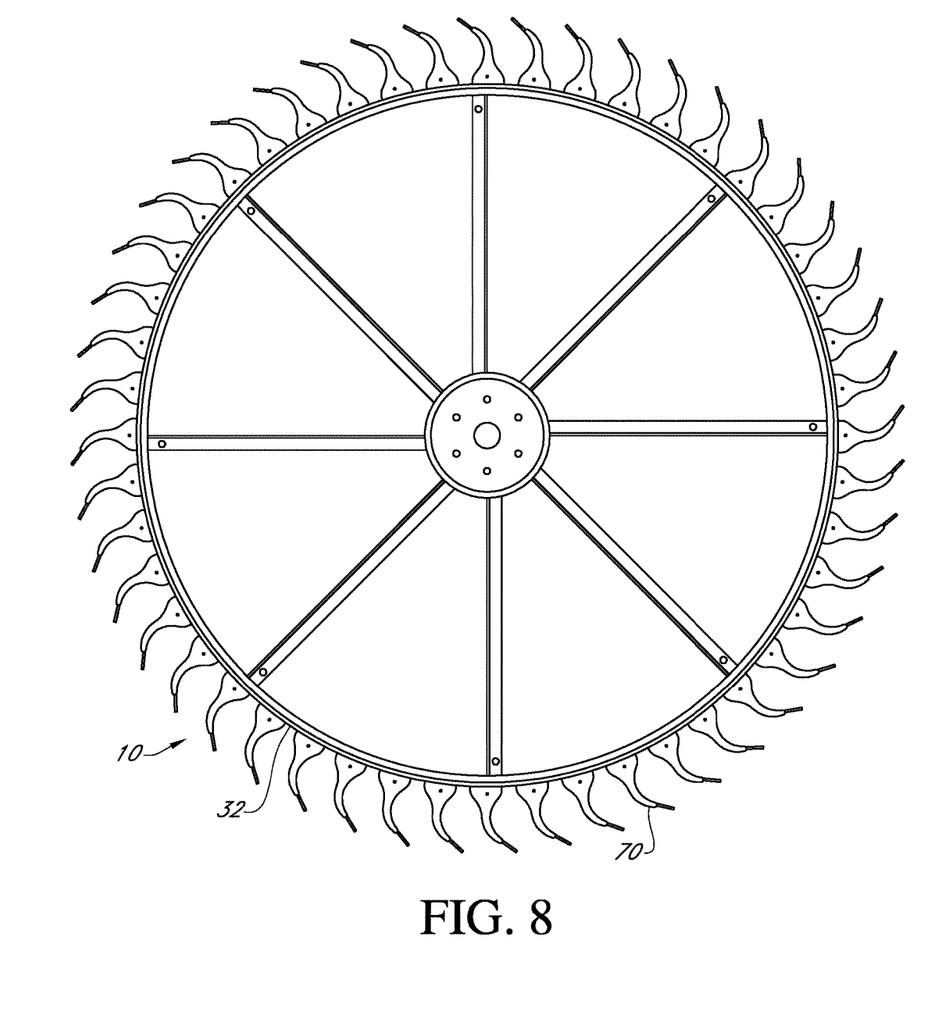
FIG. 8 is a side view of a plurality of hay rake tooth assemblies mounted to a hay rake with a plurality of mounting clips.
Figure 9:
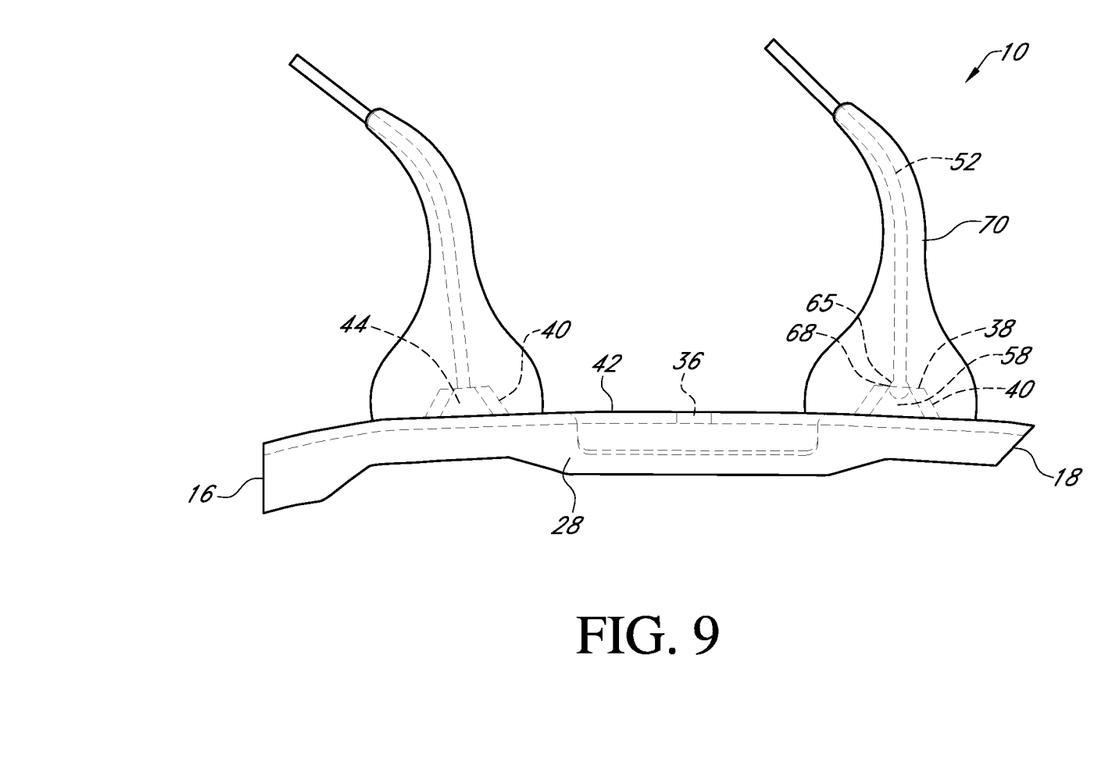
FIG. 9 is a side view of a plurality of hay rake tooth assemblies connected to mounting clip.
Figure 10:
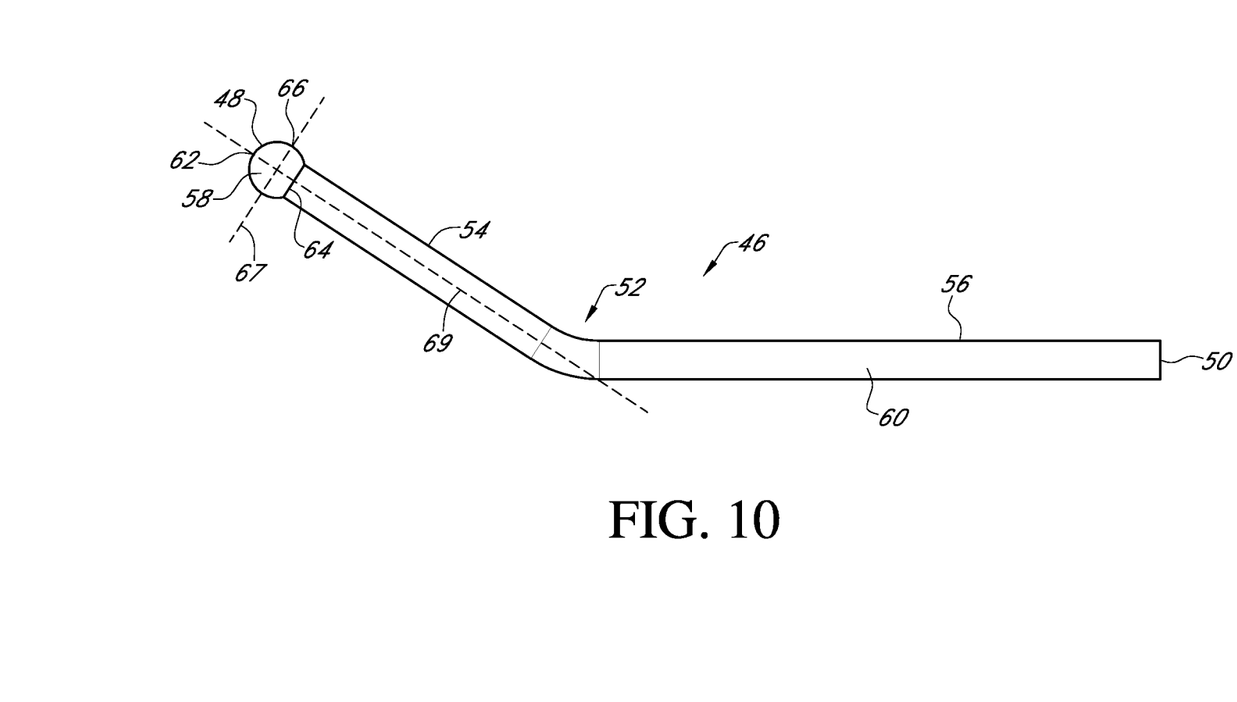
FIG. 10 is a side view of a tine of a hay rake tooth assembly.

One or more of the hay rake tooth assemblies 10 are connected to the mounting clip 12. The hay rake tooth assembly 10 has a tine 46 that extends from a first end 48 to a second end 50. Positioned between the first end 48 and the second end 50 is a bend or angled portion 52. Between the first end 48 and the bend 52 is a first section 54 and between the bend 52 and the second end 50 is a second section 56. As seen in the exemplary embodiment of FIG. 10, the first section 54 of tine 46 is approximately 2.5 inches in length and the second section 56 is approximately 4.5 inches in length. Together, the first section 54 and the second section 56 form an approximately 150° angle.

The tine 46 has a retaining member or base 58 and a shaft 60. The retaining member 58 of the present invention has a spherical or ball-like shape. In some embodiments, the retaining member 58 has a bottom 62, located at the first end 48, which has a flat profile. Due to the connection with the shaft 60, in some arrangements of the present invention, a top 64 of the retaining member 58 is not ball or spherical shape, but is formed in a monolithic structure of the tine 46—as seen in the exemplary embodiment of FIG. 10.

The tine 46, in some configurations, is received through one of the pair of tine holes 38. The retaining member 58 has a diameter at the largest width that is greater than the diameter of the pair of tine holes 38 and the shaft 60 has a smaller diameter than the diameter of the pair of tine holes 38. In this way, the retaining member 58 cannot pass entirely through the tine hole 38.

In some embodiments, the diameter of the retaining member 58 is such that a protruding portion 65 of the retaining member 58 extends through the diameter of the pair of tine holes 38, i.e., the protruding portion 65 of the retaining member 58 has a diameter smaller than the diameter of the tine hole 38 of the mounting clip 12 but larger than the diameter of the shaft 60. In one embodiment, the retaining member 58 has a midpoint 66 between the top 64 and the bottom 62. The midpoint 66 in some embodiments is along a plane 67 extending through the largest diameter of the retaining member 58 and perpendicularly to an axis 69 extending from the top 64 and bottom 62 of the retaining member 58. In some arrangements, the protruding portion 65 is approximately halfway between the midpoint 66 and the top 64. In this way, the tine 44 can move along the length of the protruding portion 65 until the shaft 60 of the tine 44 engages an edge 68 of the pair of tine holes 38. In arrangements having the mounting clip 12 with the swedged portion 40, the retaining member 58, save for the protruding portion 65 in some embodiments, resides within the cavity 44.

When assembled, the first section 54 extends substantially vertically and perpendicularly to the substantially horizontal top surface 42 of the mounting clip 12. The second section 56 extends angularly upward and outward in relation to the first section 54 and the top surface 42 of the mounting clip 12. In some embodiments, the shaft 60 terminates at the second end 50 in a flat, circular profile.

Positioned around the shaft 60 is a molding 70 of the hay rake tooth assembly 10. In some embodiments, the molding 70 is rubber. In particular arrangements, the molding 70 extends from the top surface 42 of the mounting clip 12 to a point between the second end 50 and the bend 52. The widened sections 22 provide greater surface contact area with a radially inner end of the molding 70.

In operation, a plurality of mounting clips 12 are connected around the exterior of the hay rake wheel rim 32 by fasteners 36. The length of the mounting clip 12 allows for a greater number of mounting clips 12 to be positioned about the hay rake wheel rim 32, thereby increasing the number of hay rake tooth assemblies 10. During raking, the additional hay rake tooth assemblies 10 provide greater raking power. The flanges 30 of the mounting clips 12 avoid strength reduction by preventing the mounting clips 12 from turning and maintaining alignment of the mounting clips 12 on the hay rake wheel rim 32.

In embodiments with a spherical or ball-like retaining member 58, the tine 46 can move along the axial length of the protruding portion 65 in relation to and in the same direction as the second section 56 of the tine 46 is angled. The presence of the molding 70 prevents the tine 46 from rotating, such that the tine would be out of alignment with other hay rake tooth assemblies 10. In this way, the hay rake tooth assembly 10 is able to flex or give when encountering terrain without becoming misaligned and thereby improves the durability and reduces the wear on the hay rake tooth assembly 10. If the molding 70 were to fail, the retaining member 58 would prevent the tine 46 from becoming separated from the mounting clip 12.

Therefore, a hay rake tooth assembly 10 has been provided that is stronger and more resilient, better retains a tine 46 under stress or fatigue, and improves upon the art.

From the above discussion and accompanying figures and claims it will be appreciated that the hay rake tooth assembly 10 offers many advantages over the prior art. It will be appreciated further by those skilled in the art that various other modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in light thereof will be suggested to persons skilled in the art and are to be included in the spirit and purview of this application.

What is claimed is:

1. A hay rake tooth assembly, comprising:
   a tine extending between a first end and a second end;
   the tine having a retaining member at the first end and a shaft;
   the retaining member having a ball-like shape;
   a mounting clip having a tine hole positioned through the mounting clip;
   a protruding portion of the retaining member having a diameter smaller than the diameter of the tine hole and larger than a diameter of the shaft; and
   the tine is received through the tine hole such that the protruding portion of the retaining member and the shaft are positioned above the tine hole and a remainder of the retaining member positioned below the tine hole.

2. The hay rake tooth assembly of claim 1 wherein the shaft is configured to have a diameter smaller than the diameter of the tine hole in the mounting clip, and the retaining member has a diameter larger than the diameter of the tine hole in the mounting clip at a largest diameter of the retaining member.

3. The hay rake tooth assembly of claim 1 wherein the diameter of the protruding portion is such that the shaft moves along a length of a difference in diameter between the shaft and the tine hole.

4. The hay rake tooth assembly of claim 1 further comprising the remainder of the retaining member positioned in a cavity formed between a swedged portion of the mounting clip through which the tine hole extends and a hay rake wheel rim.

5. A hay rake tooth assembly, comprising:
   a tine extending between a first end and a second end;
   the tine having a retaining member at the first end and a shaft that extends from the retaining member;
   the retaining member having a ball-like shape;
   a mounting clip with a tine hole;
   the tine hole having a swedged portion that extends upwardly from a base of the mounting clip forming a cavity, wherein the retaining member of the tine substantially resides in the cavity; and
   a molding positioned around the tine and extending upwardly from a top surface of the base.

6. The hay rake tooth assembly of claim 5 further comprising the retaining member having a protruding portion, wherein the protruding portion has a diameter smaller than a largest diameter of the retaining member and the diameter of the tine hole, but larger than the diameter of the shaft.

7. The hay rake tooth assembly of claim 6 wherein the protruding portion is configured to permit the shaft of the tine to move about a length of the protruding portion before engaging an edge of the tine hole.

* * * * *